(12) United States Patent
Tomihashi et al.

(10) Patent No.: US 6,333,372 B1
(45) Date of Patent: Dec. 25, 2001

(54) WATER-BASED PRIMER COMPOSITION FOR FLUORORESIN COATING

(75) Inventors: Nobuyuki Tomihashi; Koichiro Ogita; Hisato Sanemasa, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/701,872

(22) PCT Filed: Jun. 1, 1999

(86) PCT No.: PCT/JP99/02915

§ 371 Date: Dec. 5, 2000

§ 102(e) Date: Dec. 5, 2000

(87) PCT Pub. No.: WO99/64523

PCT Pub. Date: Dec. 16, 1999

(30) Foreign Application Priority Data

Jun. 5, 1998 (JP) .................................................. 10-157443

(51) Int. Cl.$^7$ .............................. C08L 79/08; C08L 27/12
(52) U.S. Cl. ........................................... 524/104; 524/514
(58) Field of Search ..................................... 524/514, 104

(56) References Cited

U.S. PATENT DOCUMENTS

| 5,230,961 | 7/1993 | Tannenbaum | 428/422 |
|---|---|---|---|
| 5,240,775 | 8/1993 | Tannenbaum | 428/422 |
| 5,626,907 | 5/1997 | Hagiwara et al. | 427/202 |

FOREIGN PATENT DOCUMENTS

| 56-090862 | 7/1981 | (JP) . |
|---|---|---|
| 59199774 A | 11/1984 | (JP) . |
| 61111352 A | 5/1986 | (JP) . |
| 5-509036 | 9/1993 | (JP) . |
| 6-264000 | 9/1994 | (JP) . |
| 2702041 B2 | 10/1997 | (JP) . |

*Primary Examiner*—Ana Woodward
(74) *Attorney, Agent, or Firm*—Birch, Stewart, Kolasch & Birch, LLP

(57) ABSTRACT

An aqueous primer composition for a fluororesin coating comprising a fluororesin, polyethersulfone, and at least one resin selected from the group consisting of polyamideimide and polyimide, which are dispersed in water, wherein a weight ratio of polyethersulfone to polyamideimide and/or polyimide is from 85:15 to 65:35, and a weight ratio of the total amount of polyethersulfone and polyamideimide and/or polyimide to the fluororesin is from 15:85 to 35:65. This primer composition has good adhesion properties to substrates, the freedom of color tone of the coated film, and improved corrosion resistance and steam resistance, causes no environmental problems, and has good workability.

6 Claims, No Drawings

WATER-BASED PRIMER COMPOSITION FOR FLUORORESIN COATING

This application is the national phase under 35 U.S.C. § 371 of PCT International Application No. PCT/JP99/02915 which has an International filing date of Jun. 1, 1999, which designated the United States of America.

FIELD OF THE INVENTION

The present invention relates to an aqueous primer composition for a fluororesin coating, that is, a primer composition which is used to adhere the fluororesin to various metal substrates when the fluororesin is coated on such substrates.

BACKGROUND ART

When fluororesins such as polytetrafluoroethylene (PTFE), tetrafluoroethylene-hexafluoropropylene copolymers (FEP), tetrafluoroethylene-perfluoroalkyl vinyl ether copolymers (PFA), etc. are coated on various metal substrates, it is difficult to apply the fluororesins directly on the metal substrates since the fluororesins are non-tacky as their nature.

Therefore, to coat the fluororesins on the substrates, primer compositions, which have adhesion properties to the substrates and also to the fluororesin coating to be applied on the primers, have been developed and practically used.

In recent years, engineering plastics having excellent heat resistance are developed and thus new primers for a fluororesin coating are being developed by combining such plastics and the fluororesins.

For example, JP-A-61-111352 discloses a fluororesin coating composition consisting of an aqueous dispersion of polyethersulfone and a fluororesin. However, when this composition is used as a primer, the corrosion resistance, which is the drawback of polyethersulfone, tends to further deteriorate.

JP-A-59-199774 discloses a primer composition comprising polyamideimide or polyimide as a binder component, and a specific fluororesin. However, this composition is severely discolored in the course of baking (calcination) so that the color is changed to dark brawn. Thus, the color tone of the coating is limited. In addition, since the composition contains the highly water-absorbing binder resin, the coating of the fluororesin tends to blister due to low steam resistance in the case of rice cookers, in which rice is quickly heated, such as IH cooking jars, when the primer composition is used as the primer for a PFA powder coating which is increasingly used as the coating of the rice cookers.

JP-B-2702041 discloses a primer composition comprising polyethersulfone, polyamideimide and/or polyimide, a fluororesin, and metal powder, which are dissolved or dispersed in an organic solvent. However, in the primer composition disclosed in this patent, the dispersion medium is the organic solvent such as N-methylpyrrolidone, and the binder resin is dissolved in the solvent. Therefore, it is difficult to increase the solid content of the coating. In addition, the composition of the dispersion medium has to be improved from the viewpoint of the environmental protection, which is one of the big social problems.

DISCLOSURE OF THE INVENTION

One object of the present invention is to provide a primer composition for a fluororesin coating, which has good adhesion properties to substrates, and improved corrosion resistance and steam resistance, causes no environmental problems, and has good workability.

The present inventors have found that, when polyethersulfone having good steam resistance but low corrosion resistance as a plastic component contributing to the adhesion to the substrate, and polyamideimide and/or polyimide having good corrosion resistance but low steam resistance are mixed in the form of particles at a ratio, which can make full use of the characteristics of the both resins, in an aqueous medium together with a fluororesin and the dispersion is formed in the form of a film, the characteristics of the two resins having low compatibility each other can be exhibited, and the above-described problems of the conventional primer compositions for the fluororesin coating can be solved.

In addition, since the composition is in the form of an aqueous dispersion, the resin components are not dissolved in the solvent unlike the solvent base primer compositions, and the high solid content can be achieved. Thus, the composition of the present invention can greatly contribute to the resolution of the environmental problem which is one of the big social problems, and improve the easiness and safety of the coating works because of the use of the aqueous medium as the dispersion medium and the increase of the solid content.

Accordingly, the present invention provides an aqueous primer composition for a fluororesin coating comprising a fluororesin, polyethersulfone, and at least one resin selected from the group consisting of polyamideimide and polyimide, which are dispersed in water, wherein a weight ratio of polyethersulfone to polyamideimide and/or polyimide is from 85:15 to 65:35, and a weight ratio of the total amount of polyethersulfone and polyamideimide and/or polyimide to the fluororesin is from 15:85 to 35:65.

DETAILED DESCRIPTION OF THE INVENTION

In the present invention, the weight ratio of polyethersulfone to polyamideimide and/or polyimide is from 85:15 to 65:35, preferably from 80:20 to 65:35. When the amount of polyethersulfone exceeds the above range, the corrosion resistance, which is one of the important properties of the primer for the fluororesin coating, greatly deteriorates. When the amount of polyamideimide and/or polyimide exceeds the above range, the freedom of the color tone of the coating is limited because of the discoloration in the course of baking. In addition, the steam resistance decreases when the coating of meltable fluororesins such as PFA powder is applied on the primer.

In the present invention, the weight ratio of the total amount of polyethersulfone and polyamideimide and/or polyimide to the fluororesin is from 15:85 to 35:65, preferably from 20:80 to 35:65. When the amount of the fluororesin exceeds the above range, the adhesion of the primer to the substrates decreases, and thus the corrosion resistance deteriorates. When the amount of the fluororesin is smaller than the above range, the adhesion of the coating of the fluororesin as a top coating to the primer decreases so that the layers may be peeled, and the steam resistance and the corrosion resistance deteriorate to cause the blisters between the layers.

The concentration of the solids in the primer composition of the present invention is not limited. However, such a concentration is usually 50 wt. % or less, preferably 40 wt. % or less, from the viewpoint of the handling of the composition in the transportation and application of the composition.

The kind of the fluororesin contained in the primer composition of the present invention is not limited, and any fluororesin coating, that is used in the conventional primers for the fluororesin, may be used. Examples of the fluororesin include polytetrafluoroethylene (PTFE), modified PTFE, tetrafluoroethylene-hexafluoropropylene copolymers (FEP), tetrafluoroethylene-perfluoroalkyl vinyl ether copolymers (PFA), etc. In addition, fluororesins comprising resin particles with a core-shell structure may be used. The fluororesins may be used independently or in admixture of two or more.

In the present invention, polyethersulfone, polyamideimide and/or polyimide as the binders are pulverized and stabilized in the dispersed state in water. When the binder resins have too large particle sizes, the dispersion stability tends to deteriorate and the resin particles tend to precipitate and further the surface smoothness of the coated film of the primer decreases. In addition, when the particle size is large, the properties of each binder resin prior to blending remain, so that the intended properties of the coating film may not be attained. Thus, the average particle size of polyethersulfone and polyamideimide or polyimide is usually 8 µm or less, preferably 5 µm or less.

When the particle size of the binder resins is small, the thixotropy of the composition increases and also the viscosity of the composition increases, so that the handing and application of the composition become difficult, although the surface smoothness is satisfactory. Therefore, a suitable average particle size is from 0.5 µm to 8 µm.

In addition to the binder resins and the fluororesin, the primer composition of the present invention may contain conventional additives which are contained in the aqueous primers for the fluororesin coating.

For example, pigments may be compounded for coloring. As the pigments, inorganic pigments and carbon back, which are stable at high temperature, are mainly used. Preferably, the amount of the pigments does not exceed about 20 wt. % of the resin components, since the addition of the pigments may decrease the corrosion resistance.

Metal powder having brightness such as aluminum powder, stainless steel powder, etc. can be compounded in the primer composition of the present invention. Since polyethersulfone has good transparency, the primer composition of the present invention comprising polyethersulfone can provide a film with brightness by the addition of the metal powder, even when the top coating is a clear coating. The amount of the metal powder added is preferably 10 wt. % or less of the resin components, since the addition of the metal powder may decrease the corrosion resistance of the primer.

It is also preferable to add a surfactant as an additive to improve the dispersion stability of the resins. Examples of the surfactant include nonionic surfactants and anionic surfactants. The amount of the surfactant added is preferably from 1 to 15 wt. % of the solids in the primer composition.

The viscosity of the primer composition of the present invention may be adjusted by the addition of a water-soluble polymer to improve the workability in the application process and maintain the storage stability of the composition. However, when the water-soluble polymer is thermally decomposable, the decomposed materials may deteriorate the corrosion resistance.

As the water-soluble polymer which can be used in the present invention, polyvinyl alcohol, polyvinylpyrrolidone, methylcellulose, hydroxyethylcellulose, etc. can be exemplified, although other water-soluble polymers may be used.

Furthermore, the composition of the present invention may optionally contain conventional additives of primer coatings such as a leveling agent, a defoaming agent, an anti-settling agent, etc.

The dispersion medium of the primer composition of the present invention is water, although an organic polar solvent such as N-methyl-2-pyrrolidone (NMP), dimethylacetamide, dimethylformamide, etc. may be added to the composition to facilitate the film formation after the application of the composition.

The amount of the polar solvent added depends on its kind. When the amount of the polar solvent is too low, the effect to facilitate the film formation may be insufficient, while when the amount is too high, the solvent will dissolve the particle surface of polyethersulfone, polyamideimide or polyimide dispersed and thus the stability of the composition deteriorates. In general, the amount of the organic solvent is up to 50 wt. % of water. For example, N-methyl-2-pyrrolidone is added in an amount of 5 to 50 wt. % of water.

The primer composition of the present invention may be prepared as follows:

Firstly, polyethersulfone and water are charged in a suitable pulverizing machine such as a ball mill and pulverized until the particle size of polyethersulfone reaches the above-described preferable particle size. In this step, the organic polar solvent may be added, if desired.

Polyamideimide and/or polyimide can be pulverized in the same manner as above. When polyamideimide and/or polyimide are dissolved in the solvent, water is added to the solution to precipitate the resins, and then the precipitated resins are pulverized with a suitable pulverizing machine such as a ball mill until the particle size of polyamideimide and/or polyimide reaches the above-described particle size.

Next, the aqueous dispersion of polyethersulfone and that of polyamideimide and/or polyimide are mixed with the dispersion of the fluororesin to obtain the primer composition of the present invention.

The primer composition of the present invention can be applied to the substrate, dried and baked by the same methods as those used to coat the conventional aqueous primer compositions, and thus the primer is formed on the surface of the substrate.

When the primer composition of the present invention is used, the kind of the fluororesin used as a top coating formed on the primer is not limited. That is, the primer formed from the primer composition of the present invention may be used as a primer for a top coating of PTFE, PFA or EFP dispersion, a PFA or FEP powder coating, and a fluororesin film.

The primer composition for the fluororesin coating according to the present invention has good workability and is friendly to the environment. Furthermore, the fluororesin coating film formed on the primer layer which is formed from the aqueous primer composition of the present invention has good steam resistance and corrosion resistance, which are required for rice cookers, grill pans, etc.

EXAMPLES

The present invention will be illustrated by the following Examples, which do not limit the scope of the invention in any way. In the Examples, "%" and "parts" are by weight.

Preparation of aqueous dispersion of polyethersulfone

Polyethersulfone (hereinafter referred to as "PES") 5003P (manufactured by ICI) (60 g) and ion-exchanged water (60 g) were milled with a ceramic ball mill until the PES particles were completely pulverized (about 10 minutes). Then, N-methyl-2-pyrrolidone (hereinafter referred to as "NMP") (180 g) was added, and the mixture was further milled for 48 hours.

The dispersion obtained was pulverized with a sand mill by seven passes to obtain the aqueous dispersion having a PES concentration of about 20%. PES in the dispersion had a particle size of 2 to 3 μm. The obtained dispersion will be referred to as "Aqueous PES Dispersion". Aqueous PES Dispersion was used in the preparation of the compositions in Examples and Comparative Examples.

Preparation of aqueous dispersion of polyamideimide

A commercially available solution of polyamideimide (hereinafter referred to as "PAI") (a NMP solution having a solid content of 29%) was poured in water to precipitate the resin. Then, the resin was pulverized with a ball mill for a suitable time to obtain a dispersion of the resin having an average particle size of 2 μm. The dispersion obtained had a solid content of 20%. This dispersion will be referred to as "Aqueous PAI Dispersion". Aqueous PAI Dispersion was used in the preparation of the compositions in Examples and Comparative Examples.

EXAMPLE 1

Aqueous PES Dispersion and Aqueous PAI Dispersion were mixed such that the weight ratio of PES to PAI (solids) was 85:15. Then, the PTFE dispersion (solid content: 60%) was added to the mixture such that the weight ratio of the total solid amount of PAI and PES to the fluororesin (PES+PAI:fluororesin) was 20:80, and furthermore polyvinyl alcohol as a thickening agent was added to adjust the viscosity at 135 centipoise (Brookfield viscometer; No. 2 roter; 60 rpm). Thus, an aqueous dispersion having a solid content of 34% was obtained.

EXAMPLE 2

Aqueous PES Dispersion and Aqueous PAI Dispersion were mixed such that the weight ratio of PES to PAI (solids) was 75:25. Then, the PTFE dispersion (solid content: 60%) was added to the mixture such that the weight ratio of the total solid amount of PAI and PES to the fluororesin was 20:80, and furthermore polyvinyl alcohol as a thickening agent was added to adjust the viscosity at 130 centipoise (Brookfield viscometer; No. 2 roter; 60 rpm). Thus, an aqueous dispersion having a solid content of 34% was obtained.

EXAMPLE 3

Aqueous PES Dispersion and Aqueous PAI Dispersion were mixed such that the weight ratio of PES to PAI (solids) was 65:35. Then, the PTE dispersion (solid content: 60%) was added to the mixture such that the weight ratio of the total solid amount of PAI and PES to the fluororesin was 20:80, and furthermore polyvinyl alcohol as a thickening agent was added to adjust the viscosity at 120 centipoise (Brookfield viscometer; No. 2 roter; 60 rpm) Thus, an aqueous dispersion having a solid content of 30% was obtained.

EXAMPLE 4

Aqueous PES Dispersion and Aqueous PAI Dispersion were mixed such that the weight ratio of PES to PAI (solids) was 75:25. Then, the PTFE dispersion (solid content: 60%) was added to the mixture such that the weight ratio of the total solid amount of PAI and PES to the fluororesin was 15:85, and furthermore methylcellulose as a thickening agent was added to adjust the viscosity at 130 centipoise (Brookfield viscometer; No. 2 roter; 60 rpm). Thus, an aqueous dispersion having a solid content of 37% was obtained.

EXAMPLE 5

Aqueous PES Dispersion and Aqueous PAI Dispersion were mixed such that the weight ratio of PES to PAI (solids) was 75:25. Then, the PTFE dispersion (solid content: 60%) was added to the mixture such that the weight ratio of the total solid amount of PAI and PES to the fluororesin was 25:75, and furthermore methylcellulose as a thickening agent was added to adjust the viscosity at 135 centipoise (Brookfield viscometer; No. 2 roter; 60 rpm). Thus, an aqueous dispersion having a solid content of 34% was obtained.

EXAMPLE 6

Aqueous PES Dispersion and Aqueous PAI Dispersion were mixed such that the weight ratio of PES to PAI (solids) was 75:25. Then, the PTFE dispersion (solid content: 60%) was added to the mixture such that the weight ratio of the total solid amount of PAI and PES to the fluororesin was 35:65, and furthermore methylcellulose as a thickening agent was added to adjust the viscosity at 130 centipoise (Brookfield viscometer; No. 2 roter; 60 rpm). Thus, an aqueous dispersion having a solid content of 34% was obtained.

Comparative Example 1

The PTFE dispersion (solid content: 60%) was added to Aqueous PES Dispersion such that the weight ratio of PES to PTFE (solids) was 20:80, and furthermore polyvinyl alcohol as a thickening agent was added to adjust the viscosity at 130 centipoise (Brookfield viscometer; No. 2 roter; 60 rpm). Thus, an aqueous dispersion having a solid content of 34% was obtained.

Comparative Example 2

The PTFE dispersion (solid content: 60%) was added to Aqueous PAI Dispersion such that the weight ratio of PAI to PTFE (solids) was 20:80, and furthermore polyvinyl alcohol as a thickening agent was added to adjust the viscosity at 140 centipoise (Brookfield viscometer; No. 2 roter; 60 rpm). Thus, an aqueous dispersion having a solid content of 34% was obtained.

Comparative Example 3

Aqueous PES Dispersion and Aqueous PAI Dispersion were mixed such that the weight ratio of PES to PAI (solids) was 50:50. Then, the PTFE dispersion (solid content: 60%) was added to the mixture such that the weight ratio of the total solid amount of PAI and PES to the fluororesin was 20:80, and furthermore polyvinyl alcohol as a thickening agent was added to adjust the viscosity at 135 centipoise (Brookfield viscometer; No. 2 roter; 60 rpm). Thus, an aqueous dispersion having a solid content of 34% was obtained.

Comparative Example 4

PES 5003P was dissolved in NMP to obtain a solution having a solid content of 20%. To this solution, NMP and a fluororesin (FEP powder) were added such that the weight ratio of PES to the fluororesin (solids) was 20:80. Then, the mixture was dispersed in a ball mill to obtain a dispersion having a solid content of 18%. The obtained dispersion had a viscosity of 180 centipoise (Brookfield viscometer; No. 2 roter; 60 rpm).

Comparative Example 5

PES 5003P was dissolved in NMP to obtain a solution having a solid content of 20%. To this solution, a solution of polyamideimide in NMP was added such that the weight ratio of PES to PAI was 75:25, and then NMP and a fluororesin (FEP powder) were added such that the weight ratio of the total amount of PAI and PES to the fluororesin (solids) was 20:80. The mixture was dispersed in a ball mill to obtain a dispersion having a solid content of 18%. The dispersion obtained had a viscosity of 165 centipoise (Brookfield viscometer; No. 2 roter; 60 rpm).

Production of a test plate:

A coated test plate was produced by the following procedures using each of the dispersions prepared in Examples and Comparative Examples as a primer:

The surface of a pure aluminum plate (A-1050P) as a substrate was degreased with acetone and roughened by sand blasting so that the surface roughness Ra was in the range between 2.5 μm and 3.5 μm. The dusts on the surface were removed by air blowing, and then each dispersion was applied such that the dry film thickness was 10 μm.

Then, the coated aluminum plate was dried with IR at about 100° C. Thereafter, a PFA powder coating (ACX-31) was applied as a top coating and baked at 3800° C. for 20 minutes. The thickness of the top coating was 40 μm.

Test methods:

The properties of the coated films were measured or evaluated as follows:

Resistance to Corrosion with ODEN premix

The surface of the coated film of the test plate was cross cut with a cutter knife to form flaws reaching the substrate surface. The flawed test plate was dipped in the solution of an ODEN premix (manufactured by SB Foods) (20 g) dissolved in water (1 liter) and heated at 70° C. Then, every 100 hours, the surface was checked whether any irregularities such as blisters appear. The time in which the normal coating condition was maintained is reported in Table 1.

Steam resistance test

The test plate was placed in steam under 6 atm. for 8 hours. After being removed from the steam, the test plate was heated at 250° C. for 2 minutes. With the above procedure being one cycle, 20 cycles were repeated, and the formation of blisters was observed.

When no blister appeared after 20 cycles, the plate was ranked "PASS". When blisters appeared, the plate was ranked "FAIL". The results are reported in Table 1 together with the number of cycles when the blisters appeared.

TABLE 1

| Ex. No. | PES/PAI (by wt.) | PES + PAI/ Fluororesin (by wt.) | Dispersion medium | solid content (wt. %) | Resistance to Oden premix (hrs) | Steam resistance test | Viscosity of coating (cp) |
|---|---|---|---|---|---|---|---|
| 1 | 85:15 | 20:80 | Water | 34 | 1,000 | PASS | 135 |
| 2 | 75:25 | 20:80 | Water | 34 | 2,000 | PASS | 130 |
| 3 | 65:35 | 20:80 | Water | 30 | 2,500 | PASS | 120 |
| 4 | 75:25 | 15:85 | Water | 37 | 1,000 | PASS | 150 |
| 5 | 75:25 | 25:75 | Water | 34 | 2,000 | PASS | 135 |
| 6 | 75:25 | 35:65 | Water | 34 | 2,000 | PASS | 130 |
| C. 1 | 100:0 | 20:80 | Water | 34 | 100 | PASS | 130 |
| C. 2 | 0:100 | 20:80 | Water | 34 | 100 | FAIL (1 cycle) | 140 |
| C. 3 | 50:50 | 20:80 | Water | 34 | 1,000 | FAIL (3 cycles) | 135 |
| C. 4 | 100:0 | 20:80 | NMP | 18 | 100 | PASS | 180 |
| C. 5 | 75:25 | 20:80 | NMP | 18 | 500 | PASS | 165 |

What is claimed is:

1. An aqueous primer composition for a fluororesin coating comprising a fluororesin, polyethersulfone, and at least one resin selected from the group consisting of polyamideimide and polyimide, which are dispersed in water, wherein a weight ratio of polyethersulfone to polyamideimide and/or polyimide is from 85:15 to 65:35, and a weight ratio of the total amount of polyethersulfone and polyamideimide and/or polyimide to the fluororesin is from 15:85 to 35:65.

2. The aqueous primer composition for a fluororesin coating according to claim 1, wherein said polyethersulfone, and polyamideimide and/or polyimide have an average particle size of from 0.5 μm to 8 μm.

3. The aqueous primer composition for a fluororesin coating according to claim 1, which further comprises an organic polar solvent in an amount of 50 wt. % or less of water.

4. The aqueous primer composition for a fluororesin coating according to claim 3, wherein said organic solvent is N-methyl-2-pyrrolidone.

5. The aqueous primer composition for a fluororesin coating according to claim 4, wherein an amount of N-methyl-2-pyrrolidone is from 5 to 50 wt. % of water.

6. The aqueous primer composition for a fluororesin coating according to any one of claims 1 to 5, wherein a solid concentration is 50 wt. % or less.

* * * * *